(12) United States Patent  
Aoki (10) Patent No.: US 9,007,011 B2  
(45) Date of Patent: Apr. 14, 2015

(54) DRIVING CONTROL DEVICE OF BRUSHLESS MOTOR

(71) Applicant: Minebea Co., Ltd., Kitasaku-gun, Nagano (JP)

(72) Inventor: Masato Aoki, Iwata (JP)

(73) Assignee: Minebea Co., Ltd., Nagano (JP)

( * ) Notice: Subject to any disclaimer, the term of this patent is extended or adjusted under 35 U.S.C. 154(b) by 106 days.

(21) Appl. No.: 13/760,333

(22) Filed: Feb. 6, 2013

(65) Prior Publication Data

US 2013/0207581 A1 Aug. 15, 2013

(30) Foreign Application Priority Data

Feb. 9, 2012 (JP) .................................. 2012-025882

(51) Int. Cl.
*H02P 3/00* (2006.01)
*H02P 6/24* (2006.01)
*H02P 3/22* (2006.01)

(52) U.S. Cl.
CPC ... *H02P 6/24* (2013.01); *H02P 3/22* (2013.01)

(58) Field of Classification Search
USPC ............ 318/400.09, 703, 741, 757, 761, 258, 318/261, 269, 37, 801; 701/22, 70; 180/65.8

See application file for complete search history.

(56) References Cited

U.S. PATENT DOCUMENTS

| 5,698,823 | A | * | 12/1997 | Tanahashi | 187/296 |
| 5,914,582 | A | * | 6/1999 | Takamoto et al. | 318/801 |
| 6,118,241 | A | * | 9/2000 | Kazlauskas | 318/375 |
| 6,194,856 | B1 | * | 2/2001 | Kobayashi et al. | 318/432 |
| 2004/0178755 | A1 | * | 9/2004 | Usui et al. | 318/362 |
| 2007/0222290 | A1 | | 9/2007 | Matsuhashi | |
| 2010/0030412 | A1 | * | 2/2010 | Mitsutani | 701/22 |
| 2011/0205672 | A1 | * | 8/2011 | Sakai | 361/18 |
| 2013/0003418 | A1 | * | 1/2013 | Motegi | 363/13 |
| 2014/0001987 | A1 | * | 1/2014 | Okada | 318/370 |

FOREIGN PATENT DOCUMENTS

JP 2003164002 A * 6/2003
JP 2007-259617 A 10/2007

* cited by examiner

*Primary Examiner* — Rina Duda
*Assistant Examiner* — Bickey Dhakal
(74) *Attorney, Agent, or Firm* — Carrier Blackman & Associates, P.C.; Joseph P. Carrier; Jeffrey T. Gedeon (57) ABSTRACT

A driving control device of a brushless motor includes an inverter circuit having: first arm-side switching elements that are connected between respective phases of respective armature coils of the brushless motor and one terminal of a power supply; and second arm-side switching elements that are connected between respective phases of the respective armature coils and the other terminal of the power supply, and a control unit, wherein, in a short-circuit braking according to a short-circuit braking signal, the control unit outputs a signal of turning off all the first arm-side switching element and outputs a signal of controlling the at least one of the second arm-side switching elements to perform a switching operation and turning on the other second arm-side switching elements.

6 Claims, 6 Drawing Sheets

SCHEMATIC CONFIGURATION IN THE ILLUSTRATIVE EMBODIMENT

FIG. 1

SCHEMATIC CONFIGURATION IN THE ILLUSTRATIVE EMBODIMENT

SIGNAL WAVEFORM IN SHORT-CIRCUIT BRAKING
IN THE ILLUSTRATIVE EMBODIMENT (a) FIRST PULSE SIGNAL (b) SECOND PULSE SIGNAL

RESPECTIVE WAVEFORMS IN THE BACKGROUND ART

A RELATION BETWEEN ELAPSED TIME AND ROTATING SPEED IN EACH SHORT-CIRCUIT BRAKING

DRIVING CONTROL DEVICE OF BRUSHLESS MOTOR

CROSS-REFERENCE TO RELATED APPLICATION

This application claims priority from Japanese Patent Application No. 2012-025882 filed on Feb. 9, 2012, the entire subject matter of which is incorporated herein by reference.

TECHNICAL FIELD

This disclosure relates to a driving control device that controls rotary driving of a brushless motor.

BACKGROUND

In recent years, regarding a brushless motor for an axial fan, the needs for high output and high revolution are increased. Accordingly, a problem occurs in that even when power feed from a power supply is interrupted (when cutoff of the power supply, disconnection of a power supply line and the like is caused), it takes for a propeller of the axial fan to stop, so that an accident may occur. In order to handle the such problems, it is required in the brushless motor that a rotation speed of the motor is rapidly lowered to stop the rotation of the motor.

JP-A-2007-259617 discloses an invention of short-circuit braking (short brake) that shortly stops rotation of a motor when interruption of power feed from a power supply.

According to the background short-circuit braking disclosed in JP-A-2007-259617, when the power feed from the power supply is interrupted, all switching elements of an upper arm-side of a driving circuit (inverter circuit) are turned off and all switching elements of a lower arm-side are turned on. Accordingly, an armature coil of the motor is shorted and operates as an electromagnetic brake, so that the rotation of the motor can be stopped in a short time.

SUMMARY

The technology of the short-circuit braking disclosed in JP-A-2007-259617 simply shorts the armature coil of the motor. Therefore, a capability of the electromagnetic brake is determined depending on a feed capability of the power supply, so that it is not possible to freely control the capability of the brake.

Further, when the power feed from the power supply is interrupted, a power supply voltage is rapidly lowered. Hence, a driving unit of the motor cannot sufficiently continue to turn on the switching elements of the lower arm-side. Accordingly, the electromagnetic brake is not controlled well and the motor cannot thus continue the electromagnetic brake as necessary time, so that the time required for stop is prolonged.

Accordingly, this disclosure provides at least a driving control device of a brushless motor capable of applying an electromagnetic brake over a long time even when power feed from a power supply is interrupted.

In view of the above, a driving control device of a brushless motor of this disclosure is configured as follows. A driving control device of a brushless motor of this disclosure includes an inverter circuit having: first arm-side switching elements that are connected between respective phases of respective armature coils of the brushless motor and one terminal of a power supply; and second arm-side switching elements that are connected between respective phases of the respective armature coils and the other terminal of the power supply, and a control unit. In a short-circuit braking according to a short-circuit braking signal, the control unit outputs a signal of turning off all the first arm-side switching element and outputs a signal of controlling the at least one of the second arm-side switching elements to perform a switching operation and turning on the other second arm-side switching elements.

The other means will be described in an illustrative embodiment.

According to this disclosure, it is possible to provide a driving control device of a brushless motor capable of applying an electromagnetic brake over a long time even when power feed from a power supply is interrupted.

BRIEF DESCRIPTION OF THE DRAWINGS

The foregoing and additional features and characteristics of this disclosure will become more apparent from the following detailed descriptions considered with the reference to the accompanying drawings, wherein:

FIG. 3 illustrates waveforms of respective units when it is in short-circuit braking according to the background art, in which FIG. 3(a) illustrates a power supply voltage Vcc, FIG. 3(b) illustrates a voltage of a driving signal Vwl of a W-phase and FIG. 3(c) illustrates phase current Iw flowing in the W-phase;

FIG. 4 illustrates waveforms of respective units when it is in first short-circuit braking by a W-phase switching (a frequency and a duty ratio are fixed), in which FIG. 4(a) illustrates a power supply voltage Vcc, FIG. 4(b) illustrates a voltage of a driving signal Vwl of a W-phase and FIG. 4(c) illustrates phase current Iw flowing in the W-phase;

FIG. 5 illustrates waveforms of respective units when it is in second short-circuit braking by a W-phase switching (a frequency and a duty ratio are variable), in which FIG. 5(a) illustrates a power supply voltage Vcc, FIG. 5(b) illustrates a voltage of a driving signal Vwl of a W-phase and FIG. 5(c) illustrates phase current Iw flowing in the W-phase.

DETAILED DESCRIPTION

Hereinafter, an illustrative embodiment of this disclosure will be described with reference to the respective drawings.

(Driving Control Device 1 of Brushless Motor 20 in Illustrative Embodiment)

Figure 1:
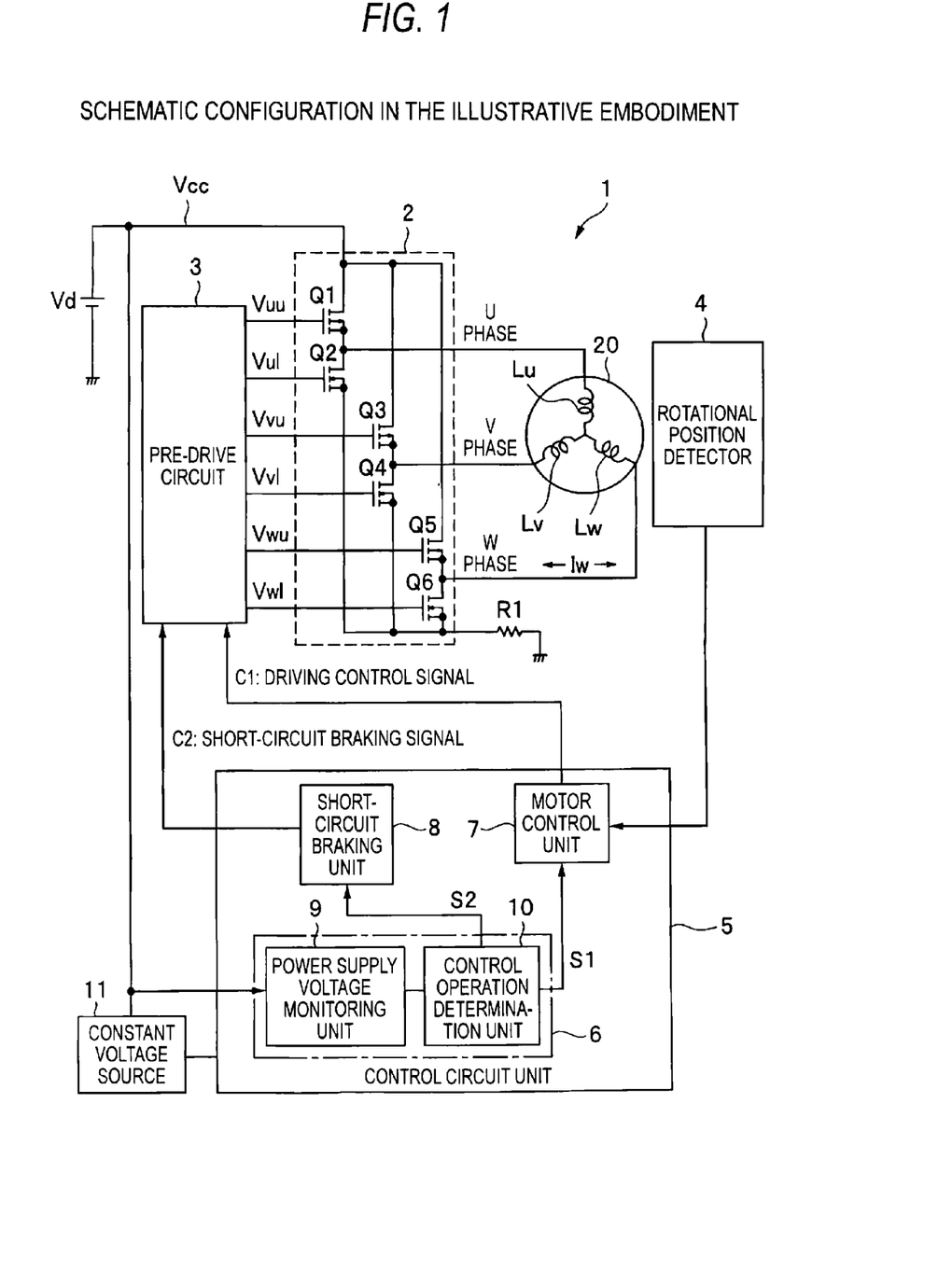
FIG. 1 is a view illustrating a schematic configuration of a driving control device according to an illustrative embodiment of this disclosure.

A configuration of a driving control device 1 of a brushless motor 20 according to an illustrative embodiment is described with reference to FIG. 1.

The driving control device 1 of the brushless motor 20 has an inverter circuit 2, a pre-drive circuit 3, a rotational position detector 4 and a control circuit unit 5. The driving control device 1 is connected to a constant voltage source 11 to which power is fed from a direct current power supply Vd and is also connected to the brushless motor 20 by three phases of a U-phase wiring, a V-phase wiring and a W-phase wiring. The driving control device 1 controls rotation of the brushless motor 20. The driving control device 1 outputs three-phase alternating current to the brushless motor 20.

The control circuit unit 5 has: a control-operation changeover unit 6 that changes over controls of the brushless motor 20 between a normal operation during which the power is fed from the direct current power supply Vd and a power failure (interruption of the power supply) during which the power feed from the direct current power supply Vd is stopped, respectively; a motor control unit 7 that outputs a driving control signal C1 to the pre-drive circuit 3 by an operation command signal S1 from the control-operation changeover unit 6 when it is in the normal operation; and a short-circuit braking unit 8 that outputs a short-circuit braking signal C2 to the pre-drive circuit 3 by an operation command signal S2 from the control-operation changeover unit 6 when it is in the power failure. The control circuit unit 5 is connected with the direct current power supply Vd, an output terminal of the rotational position detector 4 and the constant voltage source 11.

The control circuit unit 5 operates as the power is fed from the constant voltage source 11 connected to the direct current power supply Vd. When it is detected that the power feed from the direct current power supply Vd is interrupted, the control circuit unit 5 outputs the short-circuit braking signal C2 to the pre-drive circuit 3.

The direct current power supply Vd is a power supply that feeds power to the drive control device 1 and the brushless motor 20.

The constant voltage source 11 applies a constant voltage, which is based on the power fed from the direct current power supply Vd, to the control circuit unit 5.

The control-operation changeover unit 6 has a power supply voltage monitoring unit 9 and a control operation determination unit 10. The power supply voltage monitoring unit 9 detects a power supply voltage Vcc, performs an analog/digital conversion for the detected voltage and then outputs the same to the control operation determination unit 10. When the digitally converted value of the power supply voltage Vcc is a threshold value or larger, the control operation determination unit 10 outputs the operation command signal S1 to the motor control unit 7. When the digitally converted value of the power supply voltage Vcc is smaller than a threshold value, the control operation determination unit 10 outputs the operation command signal S2 to the short-circuit braking unit 8.

That is, when a signal indicating that the power is fed is input from the power supply monitoring unit 9 to the control operation determination unit 10, the control operation determination unit 10 determines whether a rotation command is issued from an upper-level apparatus (not shown). When it is determined that a rotation command is issued, the control operation determination unit 10 outputs the operation command signal S1 to the short-circuit braking unit 8 to thus rotate the brushless motor 20.

When the operation command signal S1 is input from the control operation determination unit 10, the motor control unit 7 outputs the driving control signal C1 to the pre-drive circuit 3, based on the position detection signal of a rotor by the rotational position detector 4. The driving control signal C1 is a signal that control to rotate the brushless motor 20. The control circuit unit 5 outputs the six driving control signals C1 to the pre-drive circuit 3 by the motor control unit 7 and thus controls the pre-drive circuit 3 to generate driving signals Vuu, Vul, Vvu, Vvl, Vwu, Vwl.

When the operation command signal S2 is input from the control operation determination unit 10, the short-circuit braking unit 8 outputs the short-circuit braking signal C2 to the pre-drive circuit 3. The short-circuit braking signal C2 is a signal that controls to performs short-circuit braking of the brushless motor 20. The control circuit unit 5 outputs the short-circuit braking signal C2 to the pre-drive circuit 3 by the short-circuit braking unit 8 and thus controls the pre-drive circuit 3 to generate a signal for short-circuit braking the brushless motor 20.

The pre-drive circuit 3 has six gate drive circuits, for example. When the six drive control signals C1 are input, the pre-drive circuit 3 generates the driving signals Vuu, Vul, Vvu, Vvl, Vwu, Vwl corresponding to the driving control signals C1 with the six gate drive circuits and outputs the same to the inverter circuit 2. Also, when the six short-circuit braking signals C2 are input, the pre-drive circuit 3 generates the driving signals Vuu, Vul, Vvu, Vvl, Vwu, Vwl corresponding to the short-circuit braking signals C2 with the six gate drive circuits and outputs the same to the inverter circuit 2.

The pre-drive circuit 3 and the control circuit unit 5 configure the control unit in this illustrative embodiment.

The inverter circuit 2 has six FETs (Field Effect Transistors) serving as switching elements Q1 to Q6, for example. The inverter circuit 2 has a U-phase switching leg, a V-phase switching leg and a W-phase switching leg.

The U-phase switching leg has a switching element Q1 of an upper arm (first arm) and a switching element Q2 of a lower arm (second arm). A drain terminal of the switching element Q1 is connected to the direct current power supply Vd. A source terminal of the switching element Q1 is output with an alternating current signal of a U-phase and is connected to a drain terminal of the switching element Q2. A source terminal of the switching element Q2 is connected to a direct current ground via a resistance R1. A gate terminal of the switching element Q1 is output with the driving signal Vuu. A gate terminal of the switching element Q2 is output with the driving signal Vul.

The V-phase switching leg has an upper arm-side switching element Q3 and a lower arm-side switching element Q4. A drain terminal of the switching element Q3 is connected to the direct current power supply Vd. A source terminal of the switching element Q3 is output with an alternating current signal of a V-phase and is connected to a drain terminal of the switching element Q4. A source terminal of the switching element Q4 is connected to the direct current ground via the resistance R1. A gate terminal of the switching element Q3 is output with the driving signal Vvu. A gate terminal of the switching element Q4 is output with the driving signal Vvl.

The W-phase switching leg has an upper arm-side switching element Q5 and a lower arm-side switching element Q6. A drain terminal of the switching element Q5 is connected to the direct current power supply Vd. A source terminal of the switching element Q5 is output with an alternating current signal of a W-phase and is connected to a drain terminal of the switching element Q6. A source terminal of the switching element Q6 is connected to the direct current ground via the resistance R1. A gate terminal of the switching element Q5 is output with the driving signal Vwu. A gate terminal of the switching element Q6 is output with the driving signal Vwl.

That is, the inverter circuit 2 has the upper arm-side switching elements Q1, Q3, Q5 connected between the respective phases of respective armature coils Lu, Lv, Lw of the brushless motor 20 and the one terminal of the direct current power supply Vd and has the second arm-side switching elements Q2, Q4, Q6 connected between the respective phases of the respective armature coils Lu, Lv, Lw and the ground terminal of the direct current power supply Vd.

The power is fed from the direct current power supply Vd to the inverter circuit 2. When the driving signals Vuu, Vul, Vvu, Vvl, Vwu, Vwl corresponding to the driving control signals C1 are input, the inverter circuit 2 controls the three-phase alternating current to flow to the U-phase wiring, the V-phase wiring and the W-phase wiring of the brushless motor 20. Also, when the driving signals Vuu, Vul, Vvu, Vvl, Vwu, Vwl corresponding to the short-circuit braking signals C2 are input, the inverter circuit 2 performs the short-circuit braking of the brushless motor 20.

The brushless motor 20 has the armature coils Lu, Lv, Lw. One ends of the armature coils Lu, Lv, Lw are connected in a Y shape. The other end of the armature coil Lu is connected to the U-phase, the other end of the armature coil Lv is connected to the V-phase and the other end of the armature coil Lw is connected to the W-phase, respectively. The three-phase alternating current is input from the inverter circuit 2 to the U-phase, the V-phase and the W-phase, so that the brushless motor 20 is rotated.

The rotational position detector 4 detects a rotational position of a rotor (not shown) of the brushless motor 20, has combinations of three sets of Hall sensors and amplifiers, generates three pulse signals that are obtained by amplifying detection signals of the respective Hall sensors and outputs the same to the motor control unit 7 of the control circuit unit 5.

(Short-circuit Braking Operation in this Illustrative Embodiment)

In this illustrative embodiment, a short-circuit operation that is performed when it is in a power failure will be described. In this illustrative embodiment, the power failure means that the power feed from the direct current power supply Vd is interrupted.

When the power failure occurs, the short-circuit braking unit 8 outputs the short-circuit braking signals C2 to the pre-drive circuit 3. When the short-circuit braking signals C2 are input, the pre-drive circuit 3 operates as follows.

The pre-drive circuit 3 sets the driving signals Vuu, Vvu, Vwu to be an L (low) level and outputs the same to the gate terminals of the switching elements Q1, Q3, Q5. Accordingly, the pre-drive circuit 3 turns off the upper arm-side switching elements Q1, Q3, Q5.

Also, the pre-drive circuit 3 sets the driving signals Vul, Vvl to be an H (high) level and outputs the same to the gate terminals of the switching elements Q2, Q4. Accordingly, the pre-drive circuit 3 turns on the lower arm-side switching elements Q2, Q4.

The pre-drive circuit 3 sets so that the driving signal Vwl becomes a pulse signal and outputs the same to the gate terminal of the switching element Q6. Accordingly, the pre-drive circuit 3 controls the lower arm-side switching element Q6 to perform a switching operation. In the below, the driving signal Vwl may be also referred to as the pulse signal Vwl.

Figure 2:
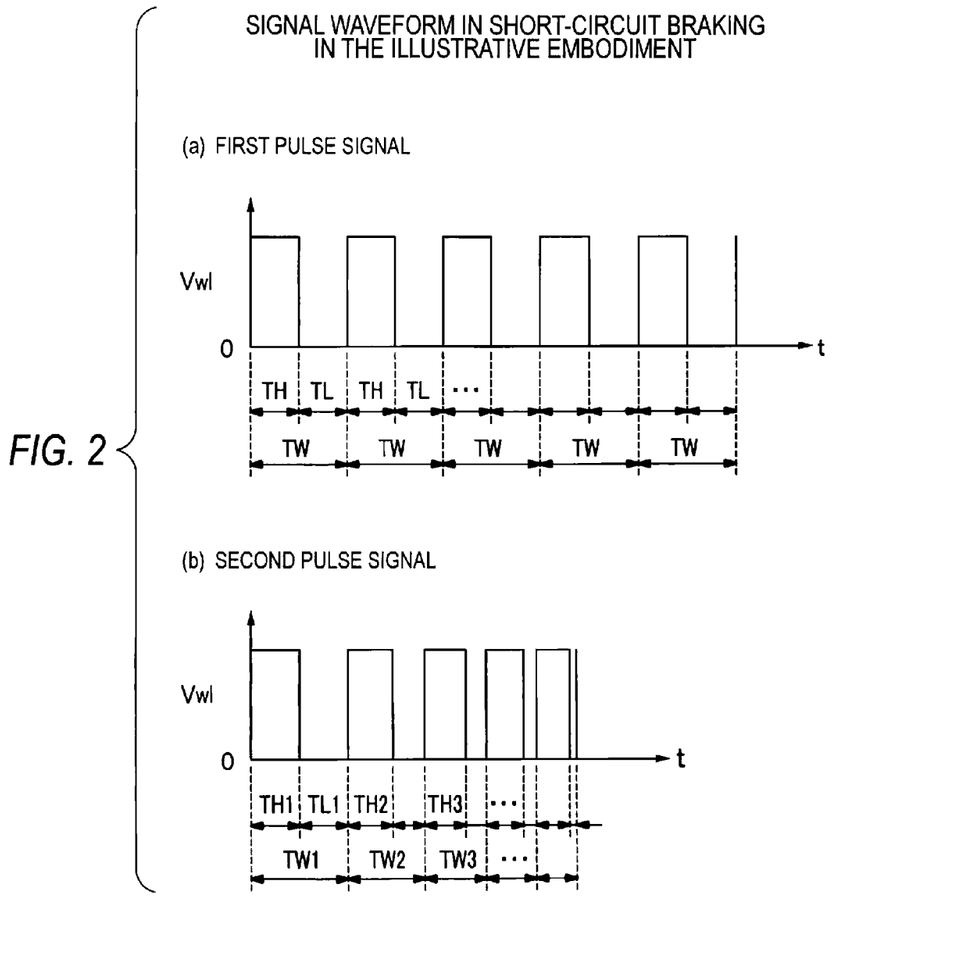
FIG. 2 illustrates signal waveforms when it is in short-circuit braking in the illustrative embodiment.

FIG. 2 illustrates specific examples of a pulse signal waveform when it is in short-circuit braking in this illustrative embodiment.

A first pulse signal Vwl shown in a part (a) of FIG. 2 (hereinafter, which will be referred as FIG. 2(a) and other symbol will be described in the same manner) has a frequency and a duty ratio that are constant as time point T goes by. In FIG. 2(a), a horizontal axis indicates the time point T and a vertical axis indicates a voltage of the first pulse signal Vwl.

A period TW of a first pulse is the same as a period TW of a second pulse or later. The periods TW of all pulses are the same. That is, a frequency (1/TW) of the first pulse signal Vwl is constant.

An H-level time span TH of the first pulse is the same as an H-level time span TH of the second pulse. Also, the period TW of the first pulse is the same as the period TW of the second pulse. That is, a duty ratio (=TH/TW) in the first period is the same as a duty ratio (=TH/TW) in the second period. The second pulse signal Vwl is output to the inverter circuit 2 when it is in first short-circuit braking shown in FIG. 4, which will be described later.

A second pulse signal Vwl shown in FIG. 2(b) has a frequency and a duty ratio that are increased as time passes. In FIG. 2(b), a horizontal axis indicates the time point T and a vertical axis indicates a voltage of the second pulse signal Vwl.

In the second pulse signal Vwl, the period TW2 is shorter than the period TW1. That is, a frequency of the second pulse signal Vwl is increased as time passes. Also, a duty ratio (=TH2/TW2) in a second period of the second pulse signal Vwl is larger than a duty ratio (=TH1/TW1) in a first period. That is, the duty ratio of the second pulse signal Vwl is increased as time passes. The driving control device 1 outputs the second pulse signal Vwl to the inverter circuit 2 when it is in second short-circuit braking shown in FIG. 5, which will be described later.

(Short-circuit Braking Operations of Background Art)

Figure 3:
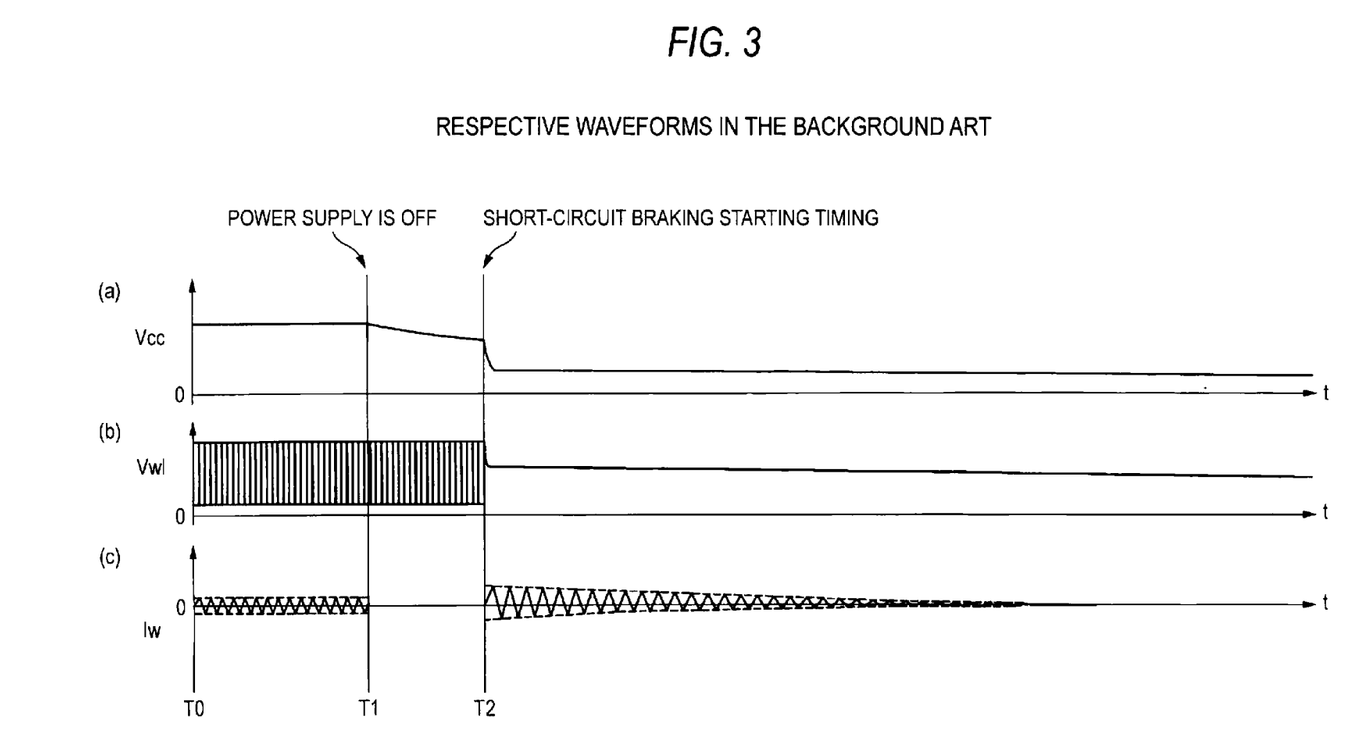

Short-circuit braking operations of the background art are described with reference to FIGS. 3, 6 and 1.

In FIG. 3(a), a vertical axis indicates the power supply voltage Vcc. In FIG. 3(b), a vertical axis indicates a voltage of the driving signal Vwl of a W-phase. In FIG. 3(c), a vertical axis indicates phase current Iw of a W-phase. In FIGS. 3(a) to 3(c), horizontal axes indicate common time. Time point T0 indicates the origin of the horizontal axis. Time point T1 indicates time at which the power supply is off. Time point T2 indicates time at which the driving control device 1 starts the short-circuit braking.

Figure 6:
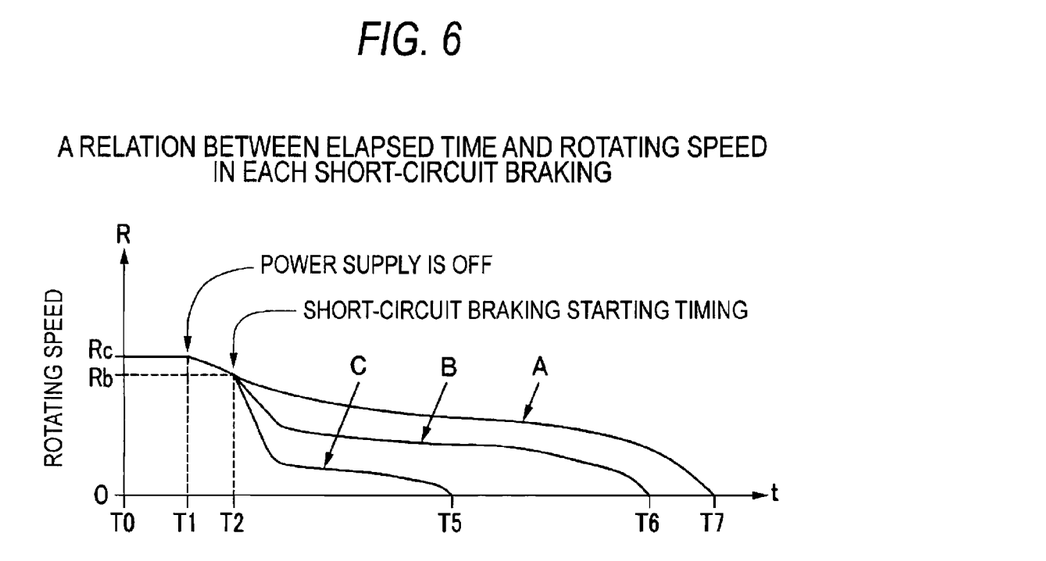
FIG. 6 illustrates a relation between elapsed time and rotating speed when it is in each short-circuit braking.

In FIG. 6, a horizontal axis indicates time. In FIG. 6, a vertical axis indicates rotating speed of the brushless motor 20.

At time point T1, the power of the direct current power supply Vd is interrupted, so that the power supply voltage Vcc is lowered below a threshold value at time point T2. Accordingly, the driving control device 1 starts the background short-circuit braking to output the L-level signal to the driving signals Vuu, Vvu, Vwu and the H-level signal to the driving signals Vul, Vvl, Vwl.

By the driving signals Vuu, Vvu, Vwu, all the upper arm-side switching elements Q1, Q3, Q5 are turned off. By the driving signals Vul, Vvl, Vwl, all the lower arm-side switching elements Q2, Q4, Q6 are turned on.

At the start of the short-circuit braking of time point T2, the power supply voltage Vcc shown in FIG. 3(a) is sharply lowered and then gently reduced. Accompanied by this, the driving signal Vwl of a W-phase shown in FIG. 3(b) is sharply lowered and then gently reduced.

From the start of the short-circuit braking of time point T2, the phase current Iw of a W-phase shown in FIG. 3(c) starts to flow and decreases as time passes.

As shown with a solid line A in FIG. 6, the rotating speed of the brushless motor 20 becomes zero and is thus stopped at time point T7.

(Operations of First Short-circuit Braking)

Operations of the first short-circuit braking of this illustrative embodiment are described with reference to FIGS. 4, 6 and 1. This is the short-circuit braking by the first pulse signal Vwl shown in FIG. 2(a).

Figure 4:
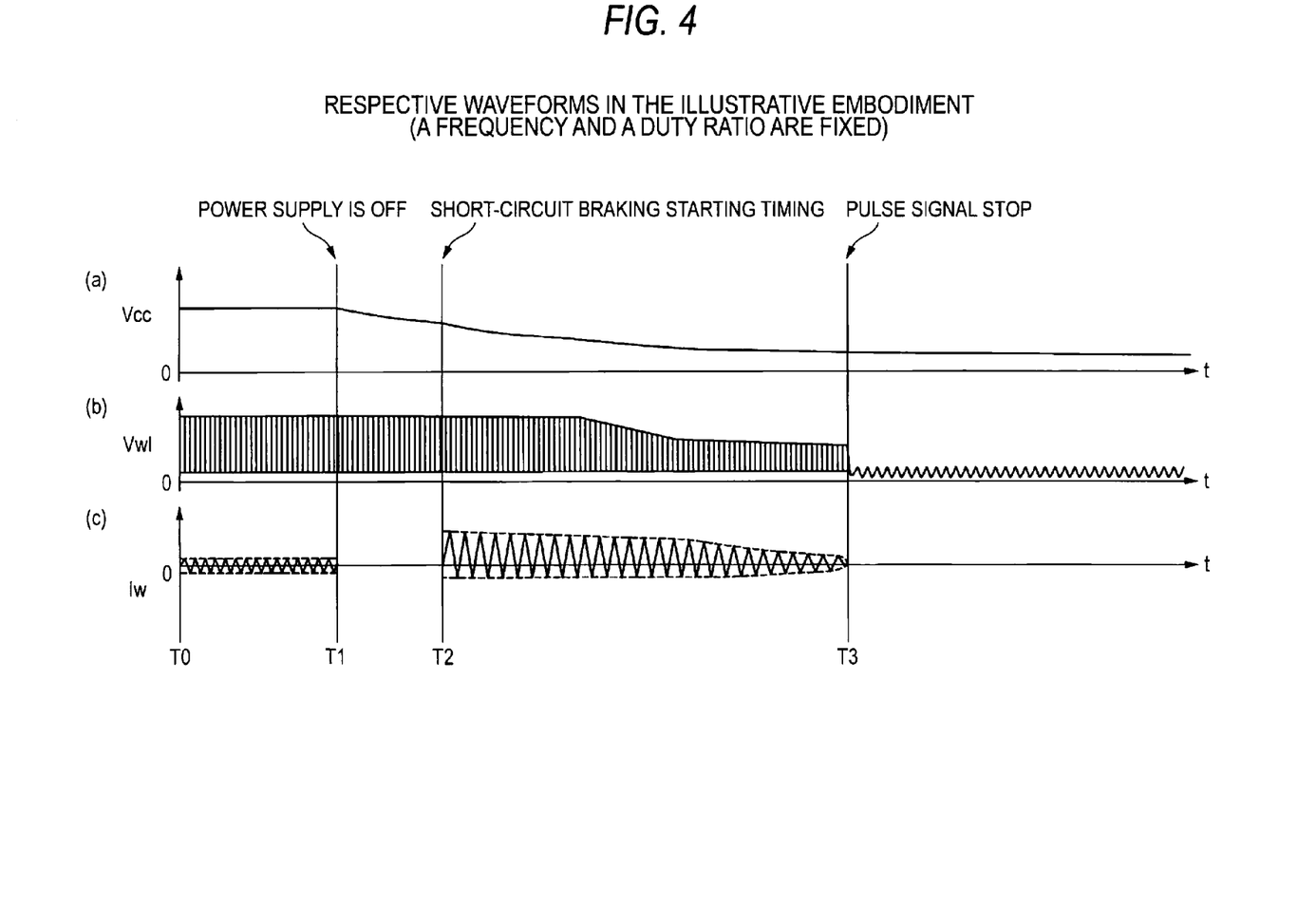

In FIG. 4(a), a vertical axis indicates the power supply voltage Vcc. In FIG. 4(b), a vertical axis indicates a voltage of the driving signal Vwl of a W-phase. In FIG. 4(c), a vertical axis indicates the phase current of a W-phase. In FIGS. 4(a) to 4(c), horizontal axes indicate common time. Time point T0 indicates the origin of the horizontal axis. Time point T1 indicates time at which the power supply is off. Time point T2 indicates time at which the driving control device 1 starts the short-circuit braking.

At time point T1, the power of the direct current power supply Vd is interrupted.

At time point T2, the power supply voltage Vcc is lowered below a threshold value. The power supply voltage monitoring unit 9 of the drive control device 1 performs the analog/digital conversion for the power supply voltage Vcc and outputs the same to the control operation determination unit 10. The control operation determination unit 10 determines that the digitally converted value of the power supply voltage Vcc is smaller than a threshold value and outputs the operation command signal S2 to the short-circuit braking unit 8.

When the operation command signal S2 is input from the control operation determination unit 10, the short-circuit braking unit 8 outputs the short-circuit braking signals C2 to the pre-drive circuit 3. Here, the short-circuit braking unit 8 starts the first short-circuit braking to output the L-level signal to the driving signals Vuu, Vvu, Vwu and the H-level signal to the driving signals Vul, Vvl. Also, the short-circuit braking unit 8 outputs the first pulse signal Vwl shown in FIG. 2(a) by the pre-drive circuit 3, thereby controlling the switching element Q6 to perform the switching operation. By the driving signals Vuu, Vvu, Vwu, all the upper arm-side switching elements Q1, Q3, Q5 are turned off. By the driving signals Vul, Vvl, all the lower arm-side switching elements Q2, Q4 are turned on.

Also at time point T2, the rotor of the brushless motor 20 rotates by the law of inertia and generates the voltages in the respective armature coils. When the switching element Q6 is turned on, the current flows from the armature coil Lw to the direct current ground via the W-phase wiring, the switching element Q6 and the resistance R1. Accordingly, the armature coil Lw accumulates the electromagnetic energy. When the switching element Q6 is turned off, the current flows from the armature coil Lw to a node of the direct current terminal of the direct current power supply Vd via the W-phase wiring and a parasitic diode of the switching element Q5. By this current, the decrease of the power supply voltage Vcc is suppressed, as shown in FIG. 4(a).

In the operation of the first short-circuit braking, the driving control device 1 supplies the electromagnetic energy generated in the respective armature coils to the node of the direct current terminal of the direct current power supply Vd by the switching operation of the switching element Q6 and then suppresses the decrease of the power supply voltage Vcc, as shown in FIG. 4(a). Accordingly, the driving control device 1 can suppress the decrease of the power supply voltage Vcc between time points T2 and T3.

Since the decrease of the power supply voltage Vcc is suppressed between time point T2 and T3 and the voltage necessary for the operation of the pre-drive circuit 3 is maintained, the control circuit unit 5 can output the short-circuit braking signals C2 to the pre-drive circuit 3. The pre-drive circuit 3 can output the L-level signal to the driving signals Vuu, Vvu, Vwu and the H-level signal to the driving signals Vul, Vvl. Also, the inverter circuit 2 can turn on the switching elements Q2, Q4. Accordingly, the driving control device 1 can perform the short-circuit braking of the brushless motor 20.

At time point T3, the power supply voltage Vcc is lowered below the voltage necessary for the operation of the pre-drive circuit 3, for example. Since the pre-drive circuit 3 stops the operation thereof, the pulse signal Vwl is not output and the driving signals Vul, Vvl are not output, as shown in FIG. 4(b). Accordingly, the short-circuit braking of the brushless motor 20 is not performed.

After that, the brushless motor 20 rotates by the inertia while the short-circuit braking is not applied thereto, and the rotation thereof stops at time point T6 (FIG. 6).

At a period between time points T2 and T3, the phase current Iw of a W-phase shown in FIG. 4(c) is larger than the phase current Iw of FIG. 3(c) when it is in the background short-circuit braking. The first short-circuit braking exhibits the higher short-circuit braking effect, compared to the background short-circuit braking. As shown with a solid line B in FIG. 6, when it is in the first short-circuit braking, the driving control device 1 can stop the rotation of the brushless motor 20 at time point T6 earlier than time point T7 at which the rotation is stopped by the background short-circuit braking.

(Operations of Second Short-circuit Braking)

Figure 5:
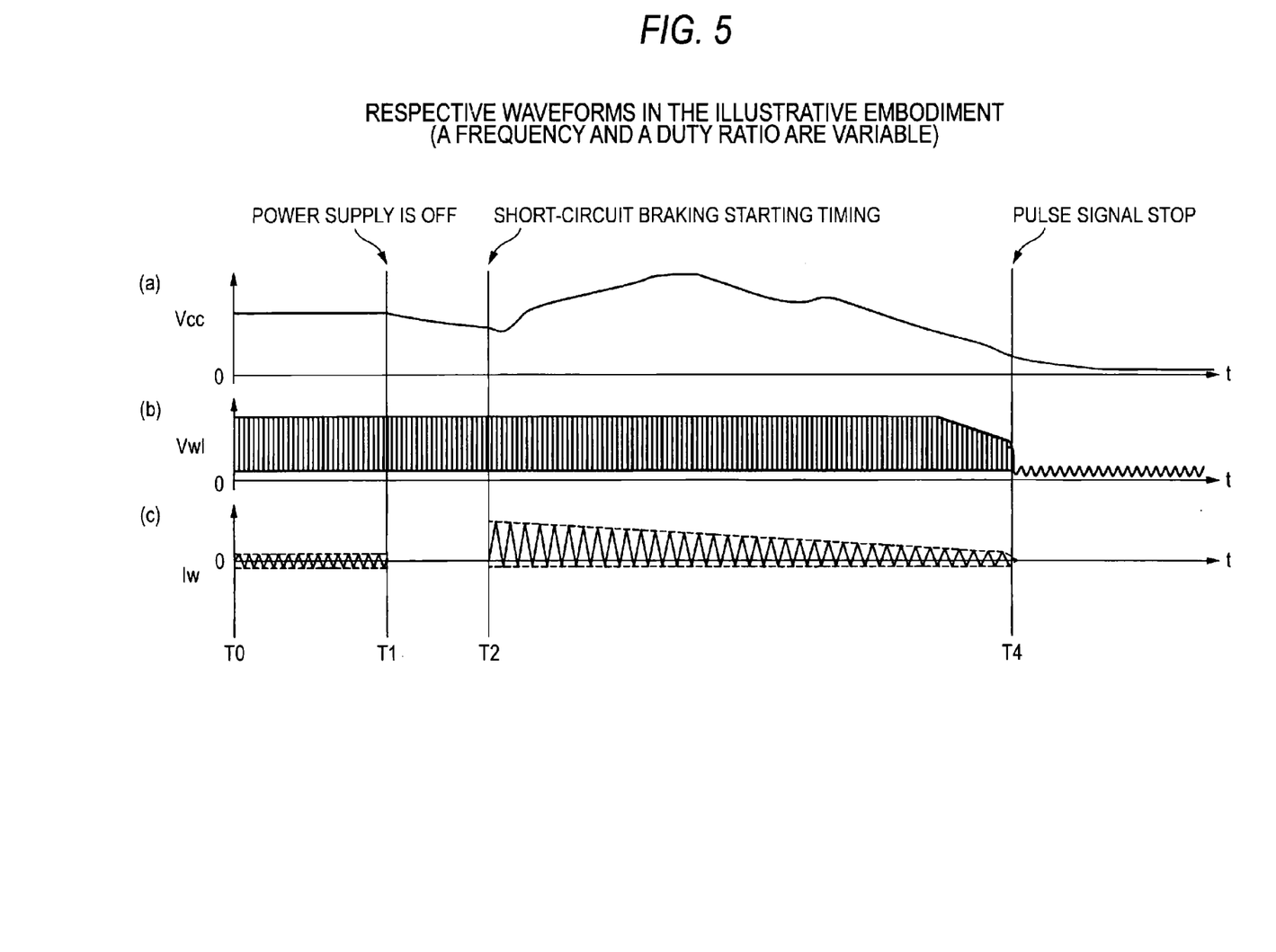

Operations of the second short-circuit braking of this illustrative embodiment will be described with reference to FIGS. 5, 6 and 1. This is the short-circuit braking by the second pulse signal Vwl shown in FIG. 2(b).

In FIG. 5(a), a vertical axis indicates the power supply voltage Vcc. In FIG. 5(b), a vertical axis indicates a voltage of the driving signal Vwl of a W-phase. In FIG. 5(c), a vertical axis indicates the phase current of a W-phase. In FIGS. 5(a) to 5(c), horizontal axes indicate common time. Time point T0 indicates the origin of the horizontal axis. Time point T1 indicates time at which the power supply is off. Time point T2 indicates time at which the driving control device 1 starts the short-circuit braking.

Contrary to the first short-circuit braking (FIG. 4), in the second short-circuit braking, the pre-drive circuit 3 sets so that the frequency of the second pulse signal Vwl is increased as time passes. Also, the pre-drive circuit 3 sets so that the duty ratio of the second pulse signal Vwl is increased as time passes.

At time point T1, the operation of the second short-circuit braking is the same as that of the first short-circuit braking.

At time point T2, the power of the direct current power supply Vd is interrupted, so that the power supply voltage Vcc is lowered below a threshold value at time point T2. The short-circuit braking unit 8 of the driving control device 1 outputs the second pulse signal Vwl shown in FIG. 2(b) through the pre-drive circuit 3, thereby controlling the switching element Q6 to perform the switching operation. The other operations are the same as those of the first short-circuit braking.

At the start of the second short-circuit braking of time point T2, the driving control device 1 sets the frequency of the second pulse signal Vwl to be low, thereby reducing the number of turning off per unit time of the switching element Q6 and suppressing the rapid increase of the power supply voltage Vcc. As time passes, the frequency of the second pulse signal Vwl is increased and the duty ratio is also increased. Hence, the more current flows from the armature coil Lw to the direct current power supply Vd through the parasitic diode of the switching element Q5, compared to the first short-circuit braking. By this current, the decrease of the power supply voltage Vcc is further suppressed, as shown in FIG. 5(a). The power supply voltage Vcc shown in FIG. 5(a) is increased within a defined upper limit and is then gently decreased.

By the above operation, the decrease of the power supply voltage Vcc is suppressed after the short-circuit braking starts at time point T2 until time point T4. Time point T4 is later than time point T3. Since the power supply voltage Vcc is maintained at a predetermined voltage or higher over a longer period than the first short-circuit braking, the pre-drive circuit 3 outputs the L-level signal to the driving signals Vuu, Vvu, Vwu and the H-level signal to the driving signals Vul, Vvl, thereby performing the short-circuit braking of the brushless motor 20. Also, at the start of the short-circuit braking of time point T2, the phase current Iw of a W-phase shown in FIG. 5(c) is larger than the phase current Iw of FIG. 4(c) in the first short-circuit braking. As a result, the second short-circuit braking exhibits the higher short-circuit braking effect, compared to the first short-circuit braking.

At time point T4, the power supply voltage Vcc becomes the voltage or lower necessary for the operation of the pre-drive circuit 3. Hence, the pre-drive circuit 3 stops the operation thereof and the pulse signal Vwl is not output and the driving signals Vul, Vvl are not output, as shown in FIG. 5(b). Accordingly, the short-circuit braking of the brushless motor 20 is not performed. After that, the brushless motor 20 rotates by the inertia while the short-circuit braking is not applied thereto, and the rotation thereof stops at time point T5 (FIG. 6).

As shown with a solid line C in FIG. 6, when it is in the second short-circuit braking, the driving control device 1 can stop the rotation of the brushless motor 20 at time point T5 earlier than time point T6 at which the rotation is stopped by the first short-circuit braking.

(Effects of this Illustrative Embodiment)
As described above, this illustrative embodiment realizes following effects (A) and (B).

(A) When the power feed from the direct current power supply Vd is interrupted, the driving control device 1 keeps the value of the power supply voltage Vcc at a predetermined value or larger by the pulse signal Vwl. Accordingly, the driving control device 1 can perform the short-circuit braking of the brushless motor 20 over a long period.

(B) The driving control device 1 sets so that the frequency of the second pulse signal Vwl is increased as time passes. By doing so, the driving control device 1 suppresses the decrease of the direct current voltage Vcc over a longer period and maintains the value of the power supply voltage Vcc at a predetermined value or larger. Accordingly, the driving control device 1 can perform the short-circuit braking of the brushless motor 20 over a longer period.

(Modified Embodiments)
This disclosure is not limited to the above illustrative embodiment and can be modified without departing from the scope of this disclosure. The modified embodiments are as follows, for example.

(a) In the above illustrative embodiment, the rotational position detector 4 of the driving control device 1 of the brushless motor 20 has the combinations of the three sets of the Hall sensors and the amplifiers. However, this disclosure is not limited thereto. For example, the driving control device of the brushless motor 20 may detect counter-electromotive force that is generated in the armature coils Lu, Lv, Lw without using the rotational position detector having the combinations of the Hall sensors and the amplifiers, thereby detecting the rotational position of the rotor.

(b) In the above illustrative embodiment, the brushless motor 20 has the three phases. However, this disclosure is not limited thereto. For example, the number of phases may be one or more.

(c) The switching elements Q1 to Q6 are not limited to the FETs and may be the other switching elements such as IGBT (Insulated Gate Bipolar Transistor).

(d) In the above illustrative embodiment, the driving control device 1 controls the one switching element Q6 of the lower arm-side to perform the switching operation when it is in the first short-circuit braking. However, this disclosure is not limited thereto. For example, the driving control device 1 may controls the two or more switching elements to perform the switching operation when it is not possible to generate the sufficient voltage by the switching operation of the one switching element Q6.

(e) The arm (second arm) that is switched when it is in the short-circuit braking is not limited to the lower arm and may be the upper arm. Also, the element to be switched is not limited to the switching element of a W-phase and the other phases are also possible.

(f) The increase of the frequency or duty ratio is not particularly limited. The increase of the frequency or duty ratio may be set so that the desired variation of the power supply voltage Vcc or desired rotation stopping time is obtained.

(g) The driving control device 1 may be configured to detect the rotating speed of the brushless motor 20 by the rotational position detector 4 and to output the pulse signal Vwl having a duty ratio or frequency corresponding to the detected rotating speed to the inverter circuit 2. Accordingly, even when it is unclear how the rotating speed of the brushless motor 20 is attenuated, since the power supply voltage Vcc is maintained by the pulse signal Vwl corresponding to the rotating speed, it is possible to apply the short-circuit braking to the brushless motor 20 over a longer period.

(h) At least a part of the driving control device 1 may be configured by hardware or software.

What is claimed is:

1. A driving control device of a brushless motor comprising:
an inverter circuit having: First arm-side switching elements that are connected between respective phases of respective armature coils of the brushless motor and one terminal of a power supply; and second arm-side switching elements that are connected between respective phases of the respective armature coils and the other terminal of the power supply, and a control unit, wherein when electric power from the power supply is not detected, a short-circuit braking according to a short-circuit braking signal is performed to brake the brushless motor, and wherein, in the short-circuit braking, the control unit outputs a signal of turning off all the first arm-side switching elements and outputs a signal of controlling at least one of the second arm-side switching elements to perform a switching operation, in which the at least one of the second arm-side switching elements is repeatedly switched, and turning on the other second arm-side switching elements.

2. The driving control device of a brushless motor according to claim 1,
wherein the control unit further comprises:
a motor control unit that outputs a driving control signal;
a short-circuit braking unit that that outputs the short-circuit braking signal, and
a control-operation changeover unit that operates the motor control unit when power feed of the power supply is detected, and operates the short-circuit braking unit when the power feed of the power supply is not detected.

3. The driving control device of a brushless motor according to claim 2,
wherein the control-operation changeover unit comprises:
a power supply voltage monitoring unit that detects the power feed from the power supply, and
a control operation determination unit that detects the power feed of the power supply and operates the motor control unit or short-circuit braking unit.

4. The driving control device of a brushless motor according to claim 2,
   wherein the short-circuit braking unit outputs a switching signal having a frequency, which is increased as time passes, to the at least one of the second arm-side switching elements and controls the at least one of the second arm-side switching elements to perform the switching operation.

5. The driving control device of a brushless motor according to claim 2,
   wherein the short-circuit braking unit outputs a switching signal having a duty ratio, which is increased as time passes, to the at least one of the second arm-side switching elements and controls the at least one of the second arm-side switching elements to perform the switching operation.

6. The driving control device of a brushless motor according to claim 1,
   wherein the brushless motor is a three-phase motor,
   wherein the first arm-side switching elements and the second arm-side switching elements are respectively connected to the respective armature coils of three phases, and
   wherein the control unit outputs a signal of turning off the first arm-side switching elements of a U-phase, a V-phase and a W-phase and outputs a signal of controlling the second arm-side switching element of at least one phase to perform the switching operation and turning on the second arm-side switching elements of the other two phases.

* * * * *